United States Patent [19]

Chszaniecke

[11] Patent Number: 4,643,661

[45] Date of Patent: Feb. 17, 1987

[54] TWIN-SCREW EXTRUSION DEVICE

[75] Inventor: Siegfried Chszaniecke, Hanover, Fed. Rep. of Germany

[73] Assignee: Hermann Berstorff Maschinenbau GmbH, Hanover, Fed. Rep. of Germany

[21] Appl. No.: 668,901

[22] Filed: Nov. 7, 1984

[30] Foreign Application Priority Data

Nov. 15, 1983 [DE] Fed. Rep. of Germany ....... 3341282

[51] Int. Cl.[4] .............................................. B29B 7/20

[52] U.S. Cl. .................................. 425/204; 264/349; 366/83; 425/208

[58] Field of Search ............... 425/200, 204, 205, 207, 425/208, 209, 206, 376; 366/83, 96, 298; 264/349, 176 R

[56] References Cited

U.S. PATENT DOCUMENTS

| | | | |
|---|---|---|---|
| 2,572,063 | 10/1951 | Skipper | 366/86 |
| 3,371,379 | 3/1968 | Reifenhäuser | 366/75 |
| 3,947,000 | 3/1976 | de Putter | 366/83 |
| 4,479,048 | 10/1984 | Kinoshita | 366/83 |

FOREIGN PATENT DOCUMENTS

| | | | |
|---|---|---|---|
| 524736 | 12/1953 | Belgium | 425/204 |
| 56-5655 | 2/1981 | Japan | 425/204 |
| 2039464 | 8/1980 | United Kingdom | 425/204 |

*Primary Examiner*—Jay H. Woo
*Assistant Examiner*—J. Fortenberry
*Attorney, Agent, or Firm*—Schwartz, Jeffery, Schwaab, Mack, Blumenthal & Evans

[57] ABSTRACT

An extrusion device comprises feed means and extrusion means. The feed means comprises a feed hopper having a feed aperture formed therein, said feed aperture feeding material into a hollow barrel in which a single screw rotates. The single screw conveys the material to the extrusion device. The extrusion device comprises twin screws rotating in a further barrel. The two barrels are co-axial with one another and are in series with one another. The diameter of the single screw is at least twice the diameter of each of the twin screws.

6 Claims, 5 Drawing Figures

TWIN-SCREW EXTRUSION DEVICE

FIELD OF THE INVENTION

The present invention relates to an extrusion device intended primarily, but not exclusively, for handling materials having a low bulk density.

BACKGROUND OF THE INVENTION AND PRIOR ART DISCUSSION

In U.S. Pat. No. 3,559,240, there is disclosed a device for supplying materials having a low bulk density to an extruder. The material is fed into the extruder from a feed hopper by means of an auxiliary screw through a by-pass conduit. On the end of the shaft of the auxiliary screw remote from the extruder, agitator arms are mounted.

The shaft of the auxiliary screw is rotated by means of a drive and transmission unit which is separate from that of the extruder. Such feed devices may also be used for twin screw extruders.

Accordingly, such material feed devices require a separate drive and transmission unit for the shaft of the auxiliary screw which has the agitator arms mounted thereon.

Such an arrangement necessitates the use of an extremely tall building because the feed hopper is disposed vertically and the extrusion device horizontally. Accordingly, the device has an extremely large overall height.

It is highly disadvantageous if a twin screw extruder is fed through only one aperture, that is to say, outlet aperture of the feed hopper. This latter is usually disposed over the rotatable twin screws.

The highly bulky material to be fed into the extruder is compressed by the auxiliary screw and is urged through the outlet aperture in the feed hopper. It then drops into twin screws which extend in a plane at right angles to the plane of the auxiliary screw and are located below the outlet aperture. This material is thus collected by the twin screws.

The rotating twin screws can, therefore, only collect the material in one of their end regions for onward transmission.

A conventional hopper feed device, which is provided with a tamping or packing mechanism and which is disposed at right angles to the twin screw extrusion device thus leaves much to be desired. The working surface area of the rotating screws of the extruder which is available for receiving the fed material is relatively small. The working surface area of the screws can, of course, only correspond at best to the cross-sectional area of the outlet aperture of the feed hopper.

An additional disadvantage of a feed hopper which is disposed at right angles to the twin screw extrusion device and which is provided with a tamping or packing mechanism resides in the fact that the tamping action causes a downwardly acting force to be applied to the screws. Since such force must act on one end of the screws, it is found that, after a period of time, wear phenomena appears on the inner wall of the cylinders in which the screws rotate.

OBJECT OF THE INVENTION

The invention seeks to provide a twin-screw extrusion device which includes a relatively simple material feed arrangement. In particular, the invention seeks to provide a feed arrangement which permits material to be fed uniformly to the twin screw, such device being reliable in operation and capable of uniformly feeding even materials of low bulk density. In addition, the present invention seeks to provide an arrangement in which the maximum possible working area in the barrel of the twin screws is utilised.

SUMMARY OF THE INVENTION

According to the present invention, there is provided an extrusion device comprising material feed means, said feed means comprising a feed hopper, said feed hopper defining an outlet aperture for said material, barrel means communicating with said feed hopper through said outlet aperture, said barrel means having an internal surface, said internal surface defining a cylindrical hollow interior of said barrel means and single screw means rotatable in said hollow interior of said barrel, said extrusion device further comprising extrusion means communicating with said material feed means and receiving fed meterial from said feed means, said extrusion means comprising extrusion barrel means, said extrusion barrel means defining an internal surface, said internal surface defining a cylindrical hollow interior of said extrusion barrel means, and twin-screw means rotatable in said hollow interior of said extrusion barrel means, wherein said hollow cylindrical interiors of said barrels are axially aligned with one another and wherein the diameter of said screw of said feed means is at least twice the diameter of each of said twin screws rotatable in said extrusion barrel.

The single screw has a diameter which is at least twice that of the twin screws and is disposed upstream of, but has an axis parallel with, the axes of the twin screws. The material to be extruded is introduced into the single screw barrel and then fed into the twin screw section. By providing these features, the twin screw extruder appears to operate more efficiently and reliably than known extrusion devices. Such an arrangement causes the material to be introduced into the twin screw extrusion device in the axial direction of the screws and distributes the material around the periphery of the screws. This overcomes the problems associated with the feeding of material downwardly into one end of a known extrusion device discussed hereinbefore.

Moreover, because the diameter and the thread depth of the single screw are relatively large, the free space in the barrel for the single screw is also relatively large and is capable of receiving a large quantity of material, even if the material has a low bulk density. Accordingly material can be fed satisfactorily and uninterruptedly into the single screw barrel and, hence into the twin screw section located downstream thereof. Thus, in a simple manner, the forces which act on the twin screws if, as is the case in the prior art, the feed is effected downwardly onto one end of the twin screws and tamping mechanism is employed, are obviated.

Preferably, the device additionally comprises common drive means for rotating said single screw and said twin-screws simultaneously at different speeds.

By providing such an arrangement, the ratio between the rate of rotation of the single screw and the rate of rotation of the twin screws may be maintained constant. By way of example, the single screw may be rotated at 30 revolutions per minute and the twin screws at 60 revolutions per minute. It may, however, be desirable for these rates of rotation to be controllable independently of one another so that the ratio of the rates can be varied. This may be necessary if the device is used for processing, at different times, materials having different bulk densities.

To permit this, in one embodiment, the device additionally comprises first drive means operatively connected to said single screw and second drive means operatively connected to said twin screws.

Desirably, in such an arrangement said single screw includes an end region remote from said communication of said feed means with said extrusion means, said first drive means being operatively connected to said screw in said remote end region and said twin screws each include an end region remote from said communication of said feed means with said extrusion means, said second drive means being operatively connected to said twin screws in said end regions of said twin screws.

In such an embodiment the drive shafts for the twin screws do not extend through the single screw. Accordingly, considerably different ratios of the rates of rotation can be readily achieved.

Since the rate of rotation of the single screw can be selected so as to be lower than the rate of rotation of the twin screws, the rate of rotation of the twin screws can be increased to a level at which the large quantity of material delivered by the single screw can be efficiently received by the twin screws and conveyed onward without difficulty.

In an advantageous embodiment of the invention, said drive means comprise drive shafts operatively coupled to each of said twin screws and wherein said single screw includes an internal surface, said internal surface defining a throughbore extending axially through said single screw, said drive shafts extending through said throughbore, said device further including transmission means coupling said drive shafts to said single screw to cause rotation of said single screw.

In such an arrangement, the rates of rotation of the single screw and the twin screws respectively are different although they are dependent upon one another. The torque for driving the single screw is derived from the drive shafts for the twin screws.

In a further preferred arrangement, power take-off pinions are disposed on the drive shafts extending through the single screw, which pinions transmit their torque, through the intermediary of intermediate toothed wheels, to an internal toothing of a ring nounted on the single screw.

However, the single screw itself may also be provided, on its inner surface with an internal toothing in which the pinions engage either directly or through the intermediary toothed wheels disposed between the pinion and the internal toothing.

The size and number of the teeth are selected so that the single screw rotates at a slower rate than the twin screws.

The single screw and/or the twin screws preferably has or have a steep, fine return delivery thread to prevent material entering the drive elements and to prevent problems arising.

The configuration of the single screw can be altered by modifying the pitch angle of the screw flights and by changing the depth and number of the screw threads. This means that the device is adaptable for processing materials of different bulk densities. A material having a low bulk density, that is to say, a highly bulky material such as regenerated film or foil, is fed into the extrusion device in a more satisfactory manner if the screw threads are deeper and a large pitch angle (the angle subtended between the screw flight and the vertical) is selected.

The feed to the extrusion device may be made even more uniform if a plurality of threads, for example, three, are provided on the periphery of the single screw.

BRIEF DESCRIPTION OF THE DRAWINGS

Some preferred embodiments of a twin-screw extrusion device in accordance with the present invention will be further described, by way of example, with reference to the accompanying drawings, in which.

DESCRIPTION OF PREFERRED EMBODIMENTS

Figure 1:
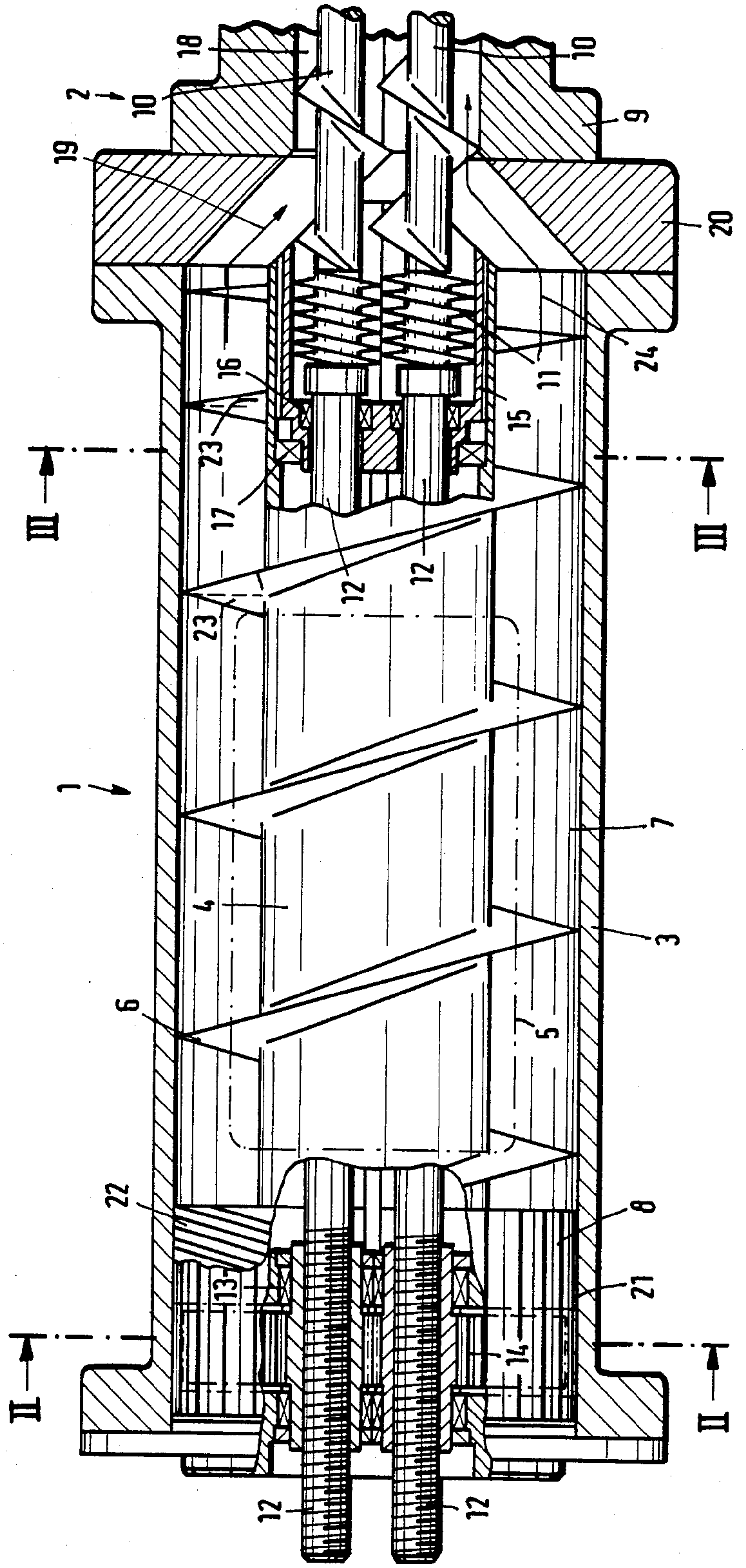
FIG. 1 is a plan view, partially in section, through an extrusion device in accordance with the present invention and shows that the device has a single screw section with a twin screw section connected thereto.
Figure 2:
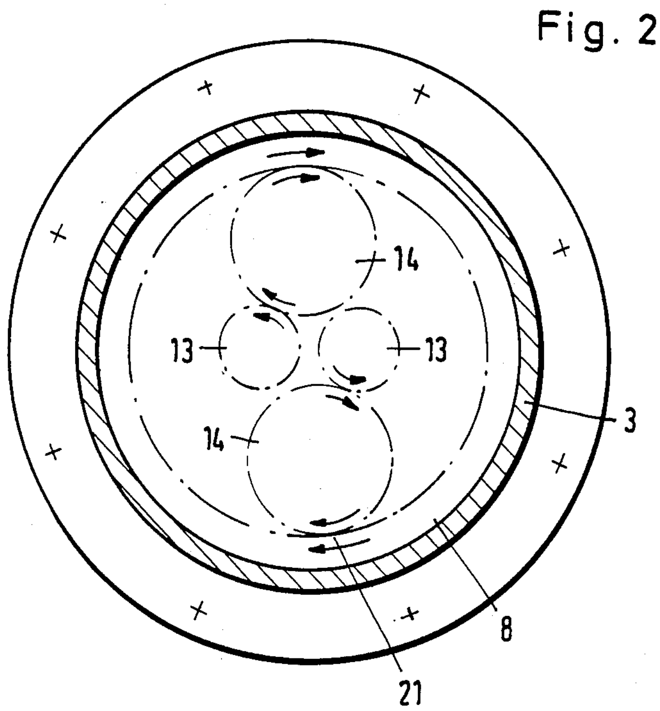
FIG. 2 is a cross-sectional view taken along the line II—II of FIG. 1.
Figure 3:
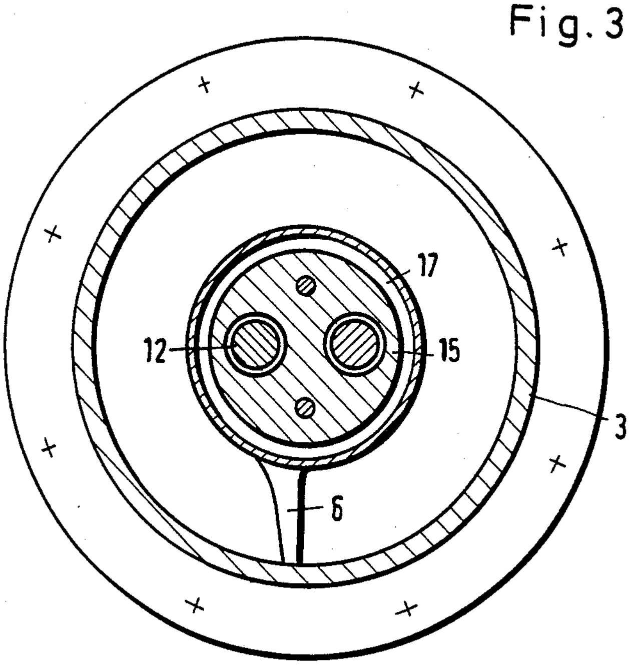
FIG. 3 is a cross-sectional view taken along the line III—III of FIG. 1.

In FIGS. 1 to 3, there is shown an extrusion device in accordance with the present invention. The device comprises a single-screw section generally referenced 1 and a twin-screw section, generally referenced 2, connected to the single-screw section 1.

The single-screw section 1 comprises a screw member 4 which rotates in a cylinder 3. A feed aperture 5 is provided in the cylinder 3 above the screw member 4. A material feed hopper is disposed on the cylinder 3 to supply material to the aperture 5.

The screw 4 has delivery flights 6 extending around its periphery, with a screw thread 7 disposed between adjacent delivery flights. A ring 8 is mounted on the screw 4 at the upstream or drive end thereof, that is to say, the end of the screw remote from the double-screw section 2.

A housing 9 capable of accommodating twin screws 10 is flange-mounted on the single screw cylinder 3 through the intermediary of a connection member 20. A transfer aperture or discharge outlet 19 is formed in the connection member 20 for transferring material from the single screw section 1 into the twin screw section 2. A return delivery thread 11 is disposed on the twin screws 10 at the upstream or drive end thereof. The twin screws 10 are rotated at identical speeds by means of drive shafts 12.

Driven pinions 13 are disposed on the drive shafts 12, which pinions 13 engage with intermediate toothed wheels or cogs 14. These intermediate cogs 14 themselves engage in an internal toothing 21 provided on the ring 8 provided at the upstream end of the single screw 4. This causes the screw member 4 to be rotated at a preselected speed which is less than that of the screws 10. The ratio of the speeds of rotation of the twin screws 10 compared with that of the screw 4 is fixed and is selected so as to produce optimum results.

The upstream ends of the twin screws 10 are disposed in bush 15 which is mounted on the drive shafts 12 by means of a bearing 16. The single-screw 4 is also mounted on the stationary bush 15 by means of a further bearing 17. The reference numeral 22 in FIG. 1 represents a return delivery thread similar in purpose to the thread 11. Reference numeral 23 is a vertical line which defines with the screw flight a pitch angle of the screw flight. Reference numeral 24, FIG. 5, simply indicates the direction of material flow from section 1 to section 2.

The screw 4 has a diameter which is at least twice that of each of the screws 10. The capacity of the space between screw threads 7 of the single screw 4 and the capacity of the spaces between the screw threads 18 of the twin screws 10 correspond to one another. In other words, the two sections 1 and 2 are so constructed that a specific quantity of bulky material can be accommodated in the twin screw section and conducted away therefrom.

The low bulk-density material which is fed into the single screw section 1 and occupies the space between the threads 7 is gradually compressed during the feed process so that it passes through the transfer port 19 in a more compact state. It then enters the screw threads 18 of the screws 10 of the twin screw section 2.

By connecting the single screw section 1 axially upstream of the double screw section 2, the material, which had a low bulk density when fed through the aperture 5, is compacted in the single screw section 1, is conveyed under pressure into the twin screw housing or cylinder 9 and is distrubuted uniformly around the periphery of the twin screws 10. The entire periphery of the twin screws is available, therefore, for receiving material. This results in the material being fed into the twin screw section in an entirely unform and pulsation-free manner.

Figure 4:
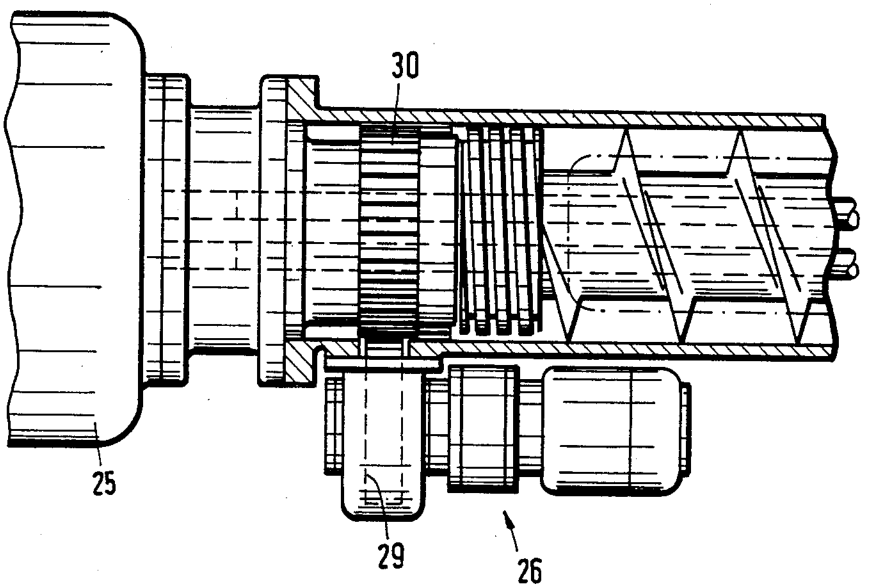
FIG. 4 illustrates an alternative drive arrangement for the screws in the screw sections.

FIG. 4 shows a possible drive which permits the screws of the single and twin screw sections to be rotated at different, and totally independent speeds.

In this arrangement, an external toothing 30 is provided on the screw member 4. A drive 26 engages in such toothing 30 through the intermediary of pinions 29. The shafts 12 of the twin screw extruder are rotated by means of a drive 25.

Figure 5:
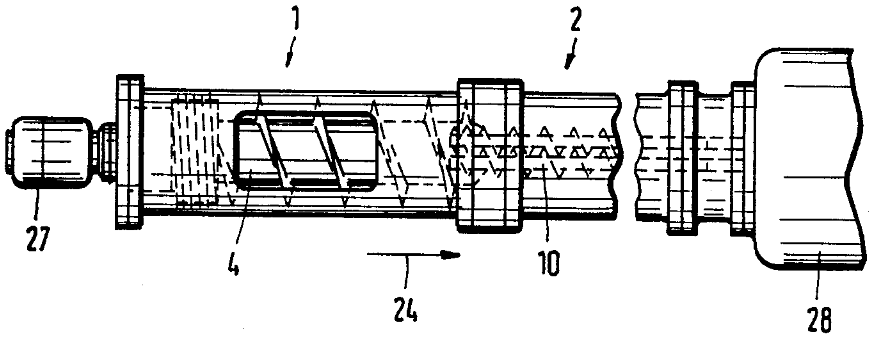
FIG. 5 illustrates a further alternative drive arrangement.

The embodiment shown in FIG. 5 also permits the screws to be rotated at different speeds. In this embodiment, the screw 4 is driven by a drive 27 and the twin screws 10 are driven by means of a drive 28.

The embodiment shown in FIG. 5 is particularly advantageous because the drive shafts for the twin screws 10 in the section 2 do not need to extend axially through the single screw section 1. This means that the diameter of the single screw may be reduced. Accordingly, the screw 4 may have a smaller diameter and, in consequence relatively deep and capacious screw threads 7. It will be understood that the FIG. 5 embodiment includes a discharge outlet, which is required and not shown.

I claim:

1. A twin screw extruder adapted to be fed by a single screw, comprising:

(a) a first hollow screw cylinder;

(b) a first single hollow feed screw having an axis of rotation and delivery flights formed thereon, and means for mounting said feed screw in said first cylinder;

(c) a feed aperture formed in said first cylinder for supplying to the cylinder feed material to be extruded, said screw flights conveying said feed to a discharge outlet at a first end of said first cylinder;

(d) a second, extruding cylinder axially aligned with and mounted to said first cylinder and having a cylindrical hollow interior, one end of which is in direct communication with said discharge outlet of said first cylinder;

(e) a pair of extruding screws mounted in said second cylinder on axes parallel to the axis of said feed screw, said extruding screws having extruding flights formed thereon, the diameter of said feed screw being at least twice the diameter of each of said extruding screws;

(f) drive shafts for each of said pair of extruding screws, said shafts extending rearwardly through the hollow interior of said hollow feed screw, and means for mounting said extruding screws for rotation without axial movement, and (g) drive means for rotating said feed screw and said extruding screws simultaneously at different speeds, whereby material fed to said feed screw is compressed in said first cylinder and therefore extruded by said extruding screws in said extruding cylinder.

2. An extrusion device as recited in claim 1, wherein said drive means comprises first drive means operatively connected to said feed screw and second drive means operatively connected to each of said extruding screws, and wherein the capacity of the free space between adjacent delivery flights in said first cylinder corresponds to the capacity of the free space between adjacent delivery flights in said extruding cylinder.

3. An extrusion device as recited in claim 2, wherein said first drive means is operatively connected to said feed screw in a second end of said first cylinder opposite said first end, and wherein said second drive means is operatively connected to the drive shafts of said extruding screws in said second end of said first cylinder.

4. An extrusion device as recited in claim 1, wherein said drive means includes transmission means coupling said drive shafts of said extruding screws to said feed screw to cause rotation of said feed screw.

5. An extrusion device as recited in claim 4, wherein said transmission means comprises ring means fixedly connected to said feed screw in said second end of said first cylinder, said ring means including an internal surface having teeth means formed thereon, intermediate cog means engaging with said teeth means, said pinion means disposed on said drive shafts for said extruding screws in meshing engagement with said intermediate cog means.

6. An extrusion device as recited in claim 1, further including return delivery thread means formed on the drive shafts of each of said extruding screws rearwardly adjacent said discharge outlet for preventing material from entering the hollow interior of said feed screw.

* * * * *